United States Patent
Hast

[11] 3,848,401
[45] Nov. 19, 1974

[54] GRASS CUTTER
[76] Inventor: Per Sigvard Hast, Hastholmsvagen 10, S-11644 Stockholm, Sweden
[22] Filed: Sept. 28, 1973
[21] Appl. No.: 401,958

[30] Foreign Application Priority Data
Sept. 29, 1972 Sweden............................ 12581/72

[52] U.S. Cl..................................... 56/296, 30/221
[51] Int. Cl............................................ A01d 55/04
[58] Field of Search............ 56/296, 289, 229, 158, 56/298; 30/221, 222, 223, 224, 213, 214

[56] References Cited
UNITED STATES PATENTS
3,083,518  4/1963  Hultquist ............................. 56/296
3,401,513  9/1968  Rickerd ............................... 56/298
3,538,693  11/1970  Hast..................................... 56/296

Primary Examiner—Antonio F. Guida
Attorney, Agent, or Firm—Pierce, Scheffler & Parker

[57] ABSTRACT

In a cutter assembly comprising a holder bar and a cutter bar, both bars having transversely extending teeth, the cutter bar being reciprocatably movable along a side edge of the holder bar, the improvement in cutting ability accrues from using a flexible flat-sided strip as the cutter bar and causing the same to be bent to a flat sinus configuration between the teeth of the holder bar.

4 Claims, 3 Drawing Figures

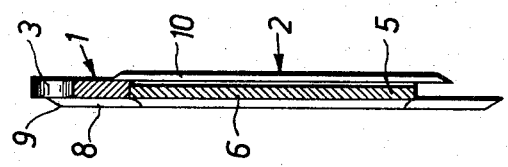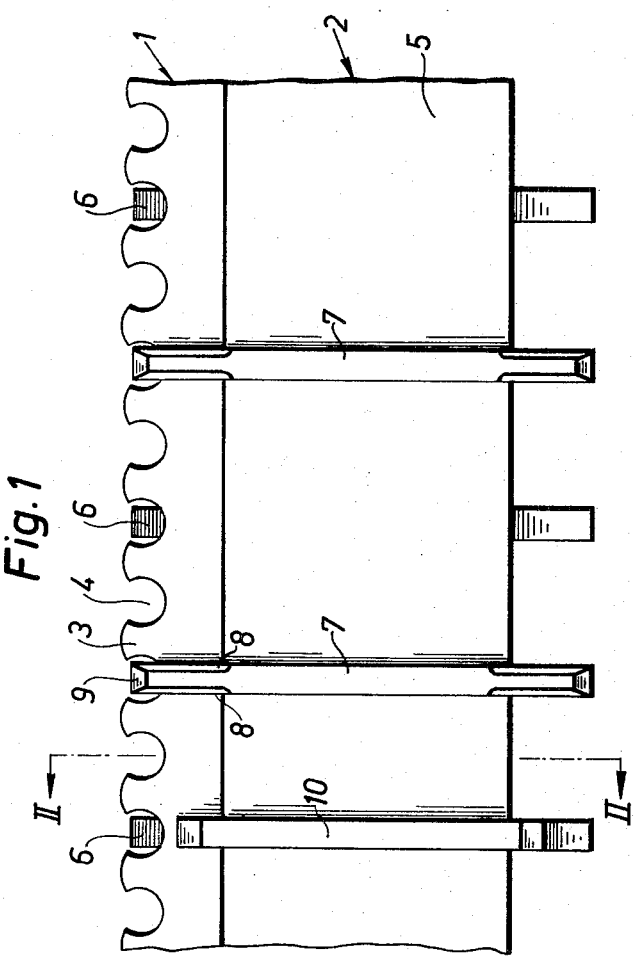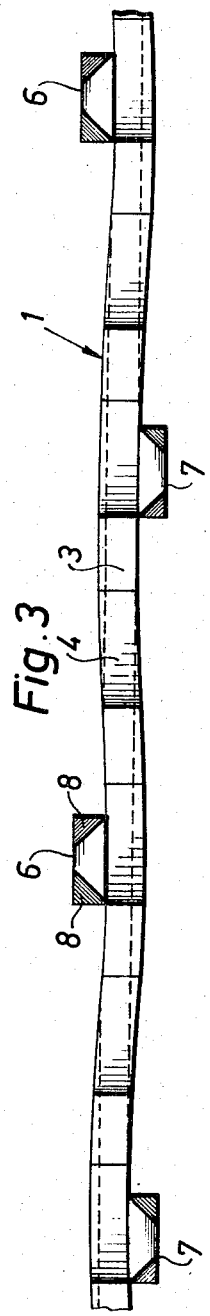

GRASS CUTTER

The present invention relates to a cutter assembly for cutting grass, hedges and similar vegetation, said assembly comprising a holder bar and a cutter bar, both having transversely extending teeth, the cutter bar being reciprocatingly movable along the edge of the holder bar thus causing a cutting action between the teeth.

Cutter assemblies of this kind are known for the purpose of harvesting plant material having stiff stalks or stems, but it has proved difficult to use them for cutting yieldable material such as lawn grass. Such use is made possible by the present invention, which provides the improvement that the cutter bar is formed as a flexible strip and that the teeth on the holder bar are placed alternatingly on the flat sides of the cutter bar, the spacing between the teeth on the holder bar, measured perpendicularly to the plane of the cutter bar, being less than the thickness of the cutter bar so that the teeth of the holder bar thus bend the cutter bar to a curved shape. This bending of the cutter bar causes a pressure contact between the teeth on the two bars, resulting in the same cutting action as in a pair of scissors, which makes it possible to cut soft and flexible material such as lawn grass.

In specific embodiments of the invention the teeth are shaped to deflect foreign objects, which prevents injuries to the cutter as well as to the operator.

An embodiment of the invention is described in the following specification in connection with appended drawings in which:

FIG. 1 is a top view of a cutter assembly according to invention;

FIG. 2 is a cross-section of the assembly on line II—II in FIG. 1; and

FIG. 3 is a larger scale view towards the front edge of the cutter assembly shown in FIG. 1.

The cutter assembly comprises a cutter bar 1, placed along the side edge of a holder bar 2. Both bars have sideways protruding teeth which cooperate in a cutting action when the cutter bar is reciprocated along the side edge of the holder bar, the assembly being moved in the direction of the teeth.

Cutter bar 1 is formed as a resiliently flexible metal strip having teeth 3 along the front edge, the rear edge sliding along an edge of the holder bar 2. The spaces 4 between teeth 3 form part of a circle and comprise more than 180° of the periphery thereof. Thus, the teeth are wider at their foremost end than at their central part, the fore edge of the teeth being substantially straight. In the illustrated embodiment the fore edge is slightly convex with rounded ends. This shape of teeth 3 serves the purpose of pulling the stalks, stems, etc., of the vegetable material between the teeth by the motion of the cutter bar. It also serves to deflect larger objects — such, for instance, as stones or thick twigs — from entering between the teeth, which objects otherwise would destroy the cutter, and also deflect the operator's fingers which might otherwise be badly hurt. This deflection can be made still more effective by using a small spacing between the teeth 3. The invention is, in view of these features, a substantial improvement upon prior art cutters in that it eliminates the risk for severe personal injuries.

Holder bar 2 consists essentially of a metal strip or blade 5 to which are attached teeth 6 on one flat side and similar teeth 7 on the other flat side thereof in alternation. These teeth have the shape of rods extending across holder bar 2, the tooth portions protruding at the fore edge of the bar and having the double function of holding cutter bar 1 between them, — as later described in connection with FIG. 3, — and cooperating with teeth 3 on the cutter bar for cutting grass, etc.

At the ends of the assembly there are provided cross bars 10 (one such being shown) serving to hold cutter bar 1 in its place on the side edge of the holder bar. The teeth 6 and 7 and cross bars 10 are attached to the holder bar in any suitable way, for instance by welding. Instead of separate teeth 6 and 7 the teeth may be made integral with the holder bar. The cutting edges 9 lie behind the front edges of teeth 3, in order not to deflect grass stalks and thereby prevent them from being cut. This retracted position of the edges 9 also aids in eliminating personal injuries.

As indicated in FIG. 3, the spacing between the teeth 6 and 7, measured in the direction perpendicularly to the cutter bar 1, is smaller than is the thickness of the cutter bar. By this arrangement cutter bar 1 is bent to a flat sinus shape between teeth 6 and 7 of the holder bar, a pressure thus arising between the teeth 6 and 7 and the cutter bar 1. Due to this pressure the cutting action between the teeth becomes the same as in a pair of scissors, and thus the cutter is suitable for cutting soft, yielding flexible objects such as grass stalks.

In order to obtain a suitable pressure between the opposed cutting teeth, the extent of bending of the cutter bar should be selected in view of the flexibility thereof. If, for instance, the perpendicular spacing between teeth 6 and 7 is about 1 mm, the cutter bar may suitably be 0.1 to 0.2 mm thicker. If the cutter bar has a high flexibility, the spacing can be made smaller, and it would even be possible to have a zero or a negative spacing, provided that the cutter bar is flexible enough.

While teeth 6 and 7 of the holder bar 2 need to be provided with cutting edges 8, the teeth 3 of cutter bar 1 can have edges perpendicular to the surface of the bar. This has the advantage that the cutter bar can be made by punching without any subsequent grinding of cutting edges.

As is shown in FIG. 1, there may be teeth 7 and 8 along both side edges of holder bar 2, so that cutter bars can be mounted on both sides, thus making it possible to cut in both directions.

I claim:

1. In a cutter assembly for cutting grass, hedges and similar vegetation, in which said assembly comprises a holder bar and a cutter bar, both bars having transversely extending teeth, the cutter bar being reciprocatingly movable along a side edge of the holder bar thus causing a cutting action between the teeth, the improved construction according to which the cutter bar is formed as a flat-sided flexible strip and the teeth on the holder bar are disposed alternatingly on both flat sides of the cutter bar, the spacing between the teeth on the holder bar, measured perpendicularly to the plane of the cutter bar, being less than the thickness of the cutter bar, the cutter bar thus being pressed between the teeth on the holder bar and bent to a curved shaped.

2. The improved cutter assembly defined in claim 1, in which the teeth of the cutter bar have a forwardly increasing width, the fore edge being substantially straight and orientated in the direction of the reciprocating motion of the cutter bar.

3. The improved assembly defined in claim 1, according to which the fore ends of the teeth on the holder bar lie behind the fore ends of the teeth on the cutter bar.

4. The improved cutter assembly defined in claim 1, according to which the teeth on the holder bar are rod-shaped and have cutting edges.

* * * * *